United States Patent Office 2,739,179
Patented Mar. 20, 1956

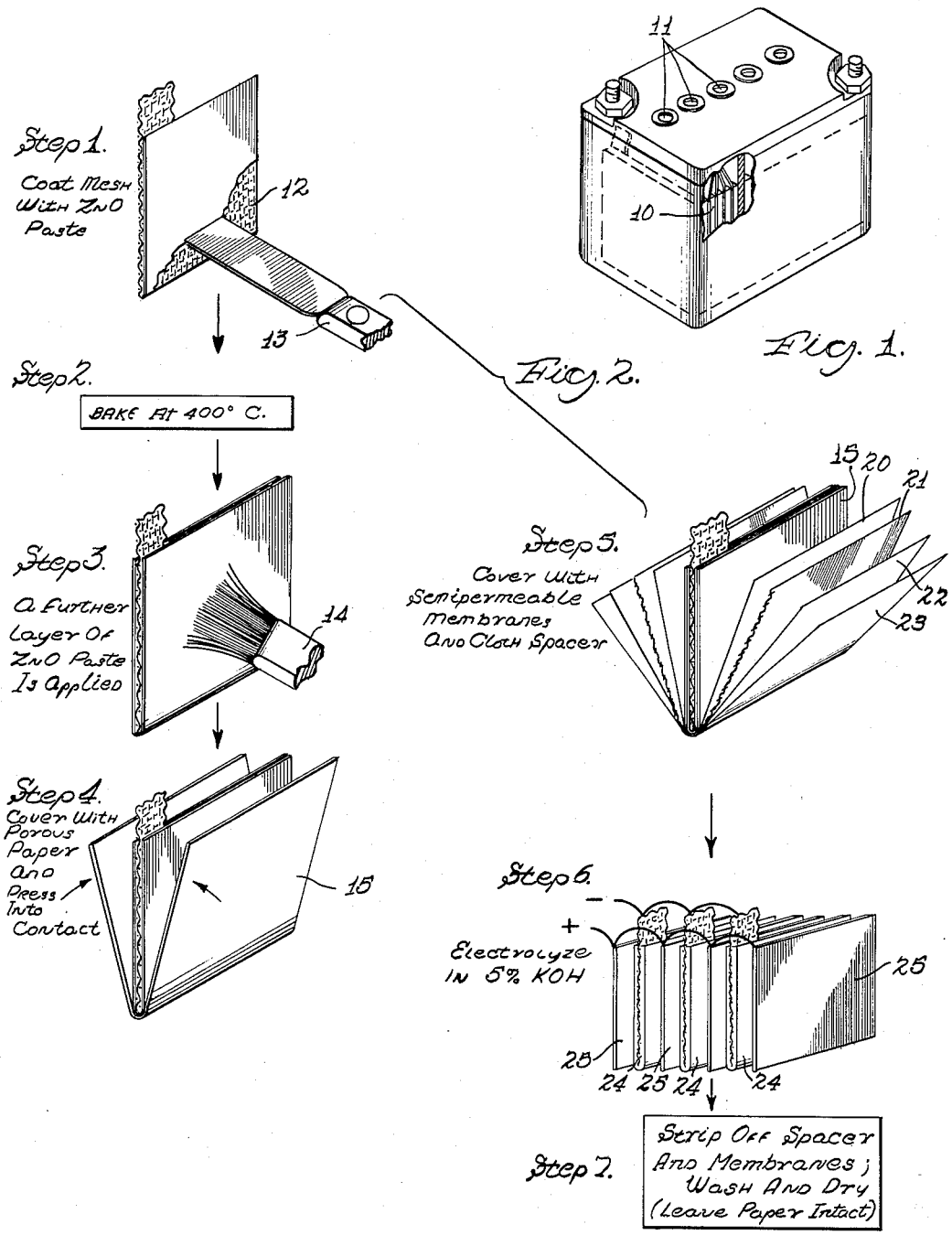

2,739,179

BATTERY PLATE AND METHOD OF MAKING IT

Edward L. Barrett, La Grange, Ill.

Application July 12, 1954, Serial No. 442,697

2 Claims. (Cl. 136—33)

The present invention relates to battery plates, and more particularly to a procedure for producing a negative plate for use in batteries such as the silver-zinc-alkali type.

It is an object of the present invention to produce a battery plate which enables production of batteries which are more powerful and efficient than those conventionally manufactured. It is another object to produce a negative battery plate which is capable of absorbing electrolyte more rapidly and of holding such electrolyte more effectively in contact with the plate. It is a more detailed object of the present invention to provide a negative battery plate in which the loss of plate material during discharge is reduced and which enables the battery to be recycled or recharged many times without substantial loss in its energy storage characteristics. Finally, it is an object of the present invention to provide a procedure for making a negative battery plate which may be carried out quickly and efficiently, and which produces a plate having a high degree of reliability and consistent operating characteristics.

Other objects and advantages of the invention will become apparent upon reading the attached detailed description and upon reference to the drawings, in which Figure 1 shows in perspective the battery of the type to which the present invention is applicable, with a portion of the case broken away to show the internal construction.

Fig. 2 is a flow diagram setting forth the steps which are preferably employed in producing a battery plate.

In spite of the large amount of development work which has been expended upon batteries, both primary and secondary, the problem of packing a maximum amount of electrical energy into a minimum amount of space is continuing one. The shortcomings of conventional types of batteries have been most dramatically pointed up in the development of batteries for guided missiles. Because of space limitations and because of the heavy drain imposed by electrical control apparatus, missile batteries occupying less than 10 cubic inches may be called upon to produce power in excess of 250 watts for periods of up to several minutes. Power output approaching this magnitude has been obtained by silver-zinc-alkali batteries employing negative plates formed of spongy zinc on a suitable support, and positive plates formed of bi-valent silver oxide, using a solution of potassium hydroxide as the electrolyte.

A typical battery consisting of five cells is shown in Fig. 1. Each of the cells has a bundle 10 of positive and negative plates, for example, five positive and six negative, separated by suitable porous separators. The battery is stored in the dry condition and just before use electrolyte is added through an opening 11 at the top of each of the cells. The amount of electrolyte is purposely quite limited, most of it being absorbed by the porous separators so that each cell contains a relatively small amount of free electrolyte.

Batteries constructed as above are required to operate in the face of large acceleration forces, but even where these are survived, the battery is required only to complete a single discharge before it is destroyed. There are, however, many battery applications in which battery life is not so short and dramatic, and where ability of the battery to be repeatedly charged and discharged is important. The negative battery plate to be described is therefore intended not only for single cycle batteries which must be capable of operating under extreme conditions of acceleration, but also batteries which are intended for repeated recycling.

In Fischback Patent No. 2,640,864 there is described a procedure for preparing a negative plate for the type of battery under discussion. It is the purpose of the present application to describe a procedure which is an improvement over that described by Fischback and an improvement over the procedures used by other researchers in this field. In the paragraphs which follow, the procedure which I use is set in detail in a series of steps. It will be recognized by one skilled in this art that at least a portion of the steps may be omitted without substantially affecting the final result. It is also true that steps may be added to the procedure described below without departing from my basic teachings. Accordingly, the invention is to be measured by the spirit and scope of the claims which are appended hereto.

In Fig. 2 the steps are graphically set forth in a flow diagram in order to aid in understanding the invention. The first step consists in applying a paste of zinc oxide to a metal grid 12. Preferably, the grid is formed of silver screen or mesh and the paste is applied to both sides by a spatula 13, as shown. Silver is preferred because of its relative inertness in the electrolyte to be used and because of its reasonable cost. In mixing the paste, care should be taken to use zinc oxide, ZnO, of high purity and water which has been distilled and demineralized. The consistency of the paste is relatively unimportant, and is a matter which may be left to the discretion of the operator. It is important that the paste be applied in an even coat, filling all of the interstices, the high points of the wire mesh serving as a guide for the applied edge of the spatula.

Following the coating operation, the plates are baked in an oven at 400° C. for approximately 10 minutes, the oxide becoming dry and hard in the process. The exact temperature is unimportant but is preferably carried out at greater than 250° in order to keep the time within limits and to insure adequate hardening of the oxide.

After the baking, a further layer of zinc oxide paste is applied to both sides. This is preferably accomplished using a brush 14 and employing paste which is of somewhat thinner consistency than that previously applied. The zinc oxide is put on to about the same thickness as a heavy coat of paint, for example, a thickness of each side of about 1/64 inch. Adherence of the coating is facilitated by the fact that some of the moisture is absorbed by the dried layer of oxide, although the surface of the second coat should remain wet and somewhat tacky in preparation for the step which is to follow.

While the plate is still wet, the plate is covered with a fold of inert porous paper 15 as shown in step 4. The paper should be large enough to cover the entire active area of the plate and preferably extends just slightly beyond the outer confines of the plate. The paper is immediately pressed into all-over contact with the wet zinc oxide surface so that the zinc oxide is gently forced into the pores of the paper. The paper itself should be rather "open" and fibrous with minute spaces between the fibers, so that it acts somewhat like a blotter and soaks up any excess water in addition to becoming firmly bonded with the upper layer of zinc oxide. In order to tell whether the bonding is adequate, a corner of the paper may be momentarily peeled back and should show a thin, adherent paint-like coating of zinc oxide paste wetting the entire area.

With regard to the inert quality of the paper, the paper should not react chemically with the potassium hydroxide electrolyte, nor should there be any substantial reaction with silver peroxide on the positive battery plates. In addition, there should be no chemical reaction between the paper and the sprongy zinc to which the zinc oxide is converted in a later step. In practice, I prefer to use a paper formed of fine filaments of pure cellulose acetate matted together to a thickness of approximately 0.004 inch. The filaments are preferably angled in more or less random fashion so as to overlie one another rather than being precisely parallel to one another and are bonded at their intersections. Paper of this type is available commercially as "non-woven fabric" or "viscon" and may be obtained in various thicknesses. It possesses a characteristic glossy sheen, yet has a porosity and flexibility on the order of that possessed by ordinary filter paper of the type used in chemical laboratories.

As a further precaution against chemical activity, the paper used in this step may be sized with a very dilute solution of inert plastic material. Such sizing may be accomplished by subjecting the paper to a solution of polystyrene dissolved in any suitable solvent such as ethylene dichloride where the solvent is capable of being driven off during drying. After sizing and while the paper is still moist, it may be gently kneaded in order to force the sizing material into all of the pores and to insure coating of all of the fibers while retaining an open porous structure. Other inert sizing materials will occur to one skilled in this art.

After the plate has been covered with paper and the paper pressed into place, the plate is preferably kept moist right up to the time it is immersed in the electrolyzing bath.

The next step in the process is the preparation for electrolyzing, designated as step 5. This consists in covering the plate with layers of regenerated cellulose film, generally referred to as "cellophane," and saran screen. The cellulose film should be plain and untreated, free of any glycerine or softener, and on the order of 0.0016 inch in thickness. A first layer of film 20 is placed in immediate contact with the paper covered negative plate and is primarily for the purpose of keeping the surface of the plate as smooth as possible. Over this a layer 21 of saran screen is applied, which may be on the order of 0.020 inch in thickness and of approximately 35 to 40 mesh. This is followed by two layers of cellulose film 22, 23, similar to the layer 20 previously applied. The layers of covering material are then flattened onto the plate, forming an assembly 24 for electrolyzing purposes of approximately 1/16 inch thickness. My studies have shown that the two outer layers 22, 23 not only provide electrical separation, but also tend to prevent any contamination of the negative plate by the positive plate which is employed in the electrolyzing process which is to follow:

In electrolyzing the plates, as shown in step 6, a plurality of negative plate assemblies 24 are interleaved with plates 25 of stainless steel, all of the negative plates and all of the positive plates being connected respectively together. The entire assembly, which may consist in all of 14 negative plates and 15 stainless steel, or positive, plates, is then lightly compressed and immersed in a bath of 5% potassium hydroxide. The potassium hydroxide is of high purity and should be particularly low in potassium carbonate. A current of 300 milliamperes per negative plate is passed through the circuit for a period of approximately 24 hours or until all of the zinc oxide has been converted to spongy zinc.

After the negative plates have been removed from the electrolyzing bath, the protective layers of cellophane and cloth 20—23 are removed, leaving the original layer of paper 15 intact on the plate. It is found that the paper tends to adhere to the spongy zinc and that spongy zinc has been formed in situ in the pores of the paper and is in intimate electrical contact with the spongy zinc on the plate itself. All traces of the electrolyte may be removed by washing the zinc plate with demineralized water, and the plate with its adherent paper coating is then dried. This completes the preparation of the negative plate, which is then interleaved with positive plates to form the assembly 10 shown in Fig. 1.

The positive plates may be of the type produced following the procedure of my copending application Serial No. 442,696, filed July 12, 1954. Prior to assembling the positive and negative plates together, a layer of cellulose film of the above-mentioned type is wrapped around the positive plate, following which the positive plate is covered with a layer of fibrous cellulose paper of the same type as is used in covering the negative plate.

Batteries produced using the plates manufactured as above have shown characteristics which are an improvement over batteries having conventional plates. It is found, first of all, that the battery may be recycled, i. e., recharged, many times without substantial loss in its ability to store electrical energy. It is believed that this ability is traceable in some measure to the fact that the closely adherent paper prevents the negative plate from throwing off particles of spongy zinc or of reconverted zinc oxide when the battery is discharged. Furthermore, it is found that the paper integrally adhering to the negative plate acts as a more effective wick to bring the electrolyte into contact with all of the active material on the plate. This is of advantage, since it cuts down the filling time and, where filling must be accomplished hurriedly, it insures that electrolyte will penetrate to all parts of the negative plate. As an additional advantage, related to the foregoing, electrolyte is efficiently absorbed and maintained in contact with the negative plate in spite of applying large accelerational forces to the battery. Even where the battery is subjected to forces on the order of 50 g., electrolyte is not thrown out of the plate assembly to a degree which would substantially lower the battery capacity.

While all of the advantages of the above plate have not, as yet, been fully determined, it appears that the wet stand life of the battery is greater than the case of conventional batteries and that the voltage characteristic, in the face of heavy current drain, is improved. Plates constructed in accordance with the above procedure have shown uniform characteristics even where only ordinary precautions are exercised in manufacture, resulting in a battery having maximum reliability.

In the following claims the term "paper" is a generic term including within its scope inert fibrous material formed into a layer of uniform thickness and having a porosity and flexibility which is on the order of that possessed by ordinary filter paper of the type used in chemical laboratories.

I claim as my invention:

1. In the process of making a negative plate for a silver-zinc-alkali battery or the like, the steps which comprise coating a metal grid with a zinc oxide paste, applying a layer of inert porous paper thereto in overall intimate contact with the paste while the paste is still wet, and then electrolyzing the plate to convert the zinc oxide to spongy zinc with the paper maintained in contact with the plate during the electrolyzing, process so that at least a portion of the spongy zinc is formed in situ in the pores of the paper.

2. In the process of making a negative plate for an alkali battery, the steps which comprise coating a grid of metal with zinc oxide paste, baking the coated screen at a temperature in excess of 250° C. until dry, applying a further layer of zinc oxide paste on each side of the plate, covering the same with porous inert paper while the zinc oxide paste is still moist and with the paper pressed intimately into contact with the wet paste, covering the plate with at least one layer of a semi-permeable membrane consisting of regenerated cellulose, electrolyzing the covered plate in a dilute solution of potassium hydroxide and with stainless steel or similar inert metal as the opposite electrode to convert the zinc oxide paste into spongy zinc, and finally removing the plate from its protective covering but with the layer of porous paper intact thereon.

References Cited in the file of this patent

UNITED STATES PATENTS

| | | |
|---|---|---|
| 2,300,627 | Merson | Nov. 3, 1942 |
| 2,561,943 | Moulton et al. | July 24, 1951 |